United States Patent
Youngquist (10) Patent No.: US 9,431,829 B2
(45) Date of Patent: Aug. 30, 2016

(54) AIRCRAFT INSTRUMENT AND BACKUP POWER THEREFOR PROVIDED BY MAGNETO P-LEAD

(71) Applicant: John S. Youngquist, Niagara Falls (CA)

(72) Inventor: John S. Youngquist, Niagara Falls (CA)

( * ) Notice: Subject to any disclaimer, the term of this patent is extended or adjusted under 35 U.S.C. 154(b) by 5 days.

(21) Appl. No.: 14/510,942

(22) Filed: Oct. 9, 2014

(65) Prior Publication Data

US 2015/0100183 A1    Apr. 9, 2015

Related U.S. Application Data

(60) Provisional application No. 61/888,667, filed on Oct. 9, 2013.

(51) Int. Cl.
*B64D 45/00* (2006.01)
*H02J 4/00* (2006.01)
*B64D 43/00* (2006.01)

(52) U.S. Cl.
CPC ............... *H02J 4/00* (2013.01); *B64D 43/00* (2013.01); *B64D 2221/00* (2013.01); *Y02T 50/53* (2013.01)

(58) Field of Classification Search
CPC ............... H02J 9/00; Y10T 370/615–370/636
USPC ..................................... 307/64–68
See application file for complete search history.

(56) References Cited

U.S. PATENT DOCUMENTS

| | | |
|---|---|---|
| 1,364,472 A | 1/1921 | Andrews |
| 1,495,036 A | 5/1924 | Palmer |
| 3,662,975 A | 5/1972 | Driskill |
| 4,598,292 A | 7/1986 | Devino |
| 5,331,935 A * | 7/1994 | Daino .................. F02N 11/087 123/179.5 |
| 6,564,628 B1 | 5/2003 | Leblond et al. |
| 8,085,168 B2 | 12/2011 | Bethel |
| 8,213,136 B2 | 7/2012 | Maddali et al. |
| 2010/0127894 A1 * | 5/2010 | Dwyer ................. F02P 15/003 340/945 |

* cited by examiner

*Primary Examiner* — Fritz M Fleming
(74) *Attorney, Agent, or Firm* — Nixon & Vanderhye P.C.

(57) ABSTRACT

An aircraft instrument includes an engine display area providing aircraft engine parameters simultaneously with an electrical system display area that selectively provides one of a plurality of aircraft electrical system parameter displays. In the event of an aircraft electrical power supply failure, the instrument may be automatically powered by otherwise unused energy safely harvested from one or all magneto P-leads of an aircraft via an energy harvesting circuit.

9 Claims, 10 Drawing Sheets

AIRCRAFT INSTRUMENT AND BACKUP POWER THEREFOR PROVIDED BY MAGNETO P-LEAD

CROSS REFERENCE TO RELATED APPLICATIONS

This application claims the benefit of U.S. Provisional Application Ser. No. 61/888,667, filed Oct. 9, 2013, which is incorporated herein by reference in its entirety.

TECHNICAL FIELD

The present technology relates generally to aircraft instruments and provisions for a reliable backup power source using surplus electrical energy from the P-leads of aircraft engine magneto combustion spark ignition systems.

BACKGROUND

Aircrafts contain numerous electrically powered instruments. Some of these instruments are of critical importance to the pilot, particularly when operating the aircraft at night or when conditions make visual references impossible. Thus, it is highly desirable to provide for continued operation of these instruments in emergency situations, such as when the aircraft's normal battery/charging electrical generating system(s) fail.

SUMMARY

An energy harvesting circuit is powered from previously unused energy available at the P-lead of an aircraft engine magneto. As long as the engine is running, the magneto still works even when there is a total electrical failure of the normal aircraft electrical supply systems (because the magneto is mechanically driven by the engine itself—and is thus one thing that will not let you down even when the battery charging alternator fails).

The P-lead provides a signal often used to measure engine revolutions per minute (RPM). However the P-lead also has a few hundred volts of otherwise effectively unused alternating current (AC) power on it—which is used in exemplary embodiments (automatically in the exemplary embodiments) to supply emergency backup electrical power to one or more aircraft instruments.

In exemplary embodiments, this is achieved by transforming previously unused P-lead AC power down to a lower AC voltage which is then rectified and regulated to supply DC backup power to the instrument(s). The instrument will use regular 14/28 volt DC power when it is available but will run indefinitely on the electrical power harvested from one magneto alone. Nevertheless, an energy harvesting circuit is used with both magnetos (their respective independent outputs being ORed together for a common redundant output to the instrument) in exemplary embodiments so that a failure of one magneto will not be critical.

One exemplary aircraft instrument includes an engine display having two engine informational display areas: one related to the aircraft engine performance parameters and another related to the aircraft electrical system to selectively provide one of a plurality of types of electrical system information including analysis results which act as a tool depicting normal and abnormal conditions in various parts of the aircraft electrical system. This combined engine/electrical system analysis and display instrument also preferably includes the above-described magneto P-lead energy harvesting circuit(s).

Other aspects, features, and advantages of the present technology will become apparent from the following detailed description when taken in conjunction with the accompanying drawings, which are a part of this disclosure and which illustrate, by way of example, different aspects of this technology.

BRIEF DESCRIPTION OF THE DRAWINGS

The accompanying drawings facilitate an understanding of various embodiments wherein.

DETAILED DESCRIPTION OF EXAMPLRY EMBODIMENTS

The following description is provided in relation to several examples (most of which are illustrated) which may share some common characteristics and features. It is to be understood that one or more features of any one example may be combinable with one or more features of the other examples. In addition, any single feature or combination of features in any of the examples may constitute additional examples.

Figure 1A:
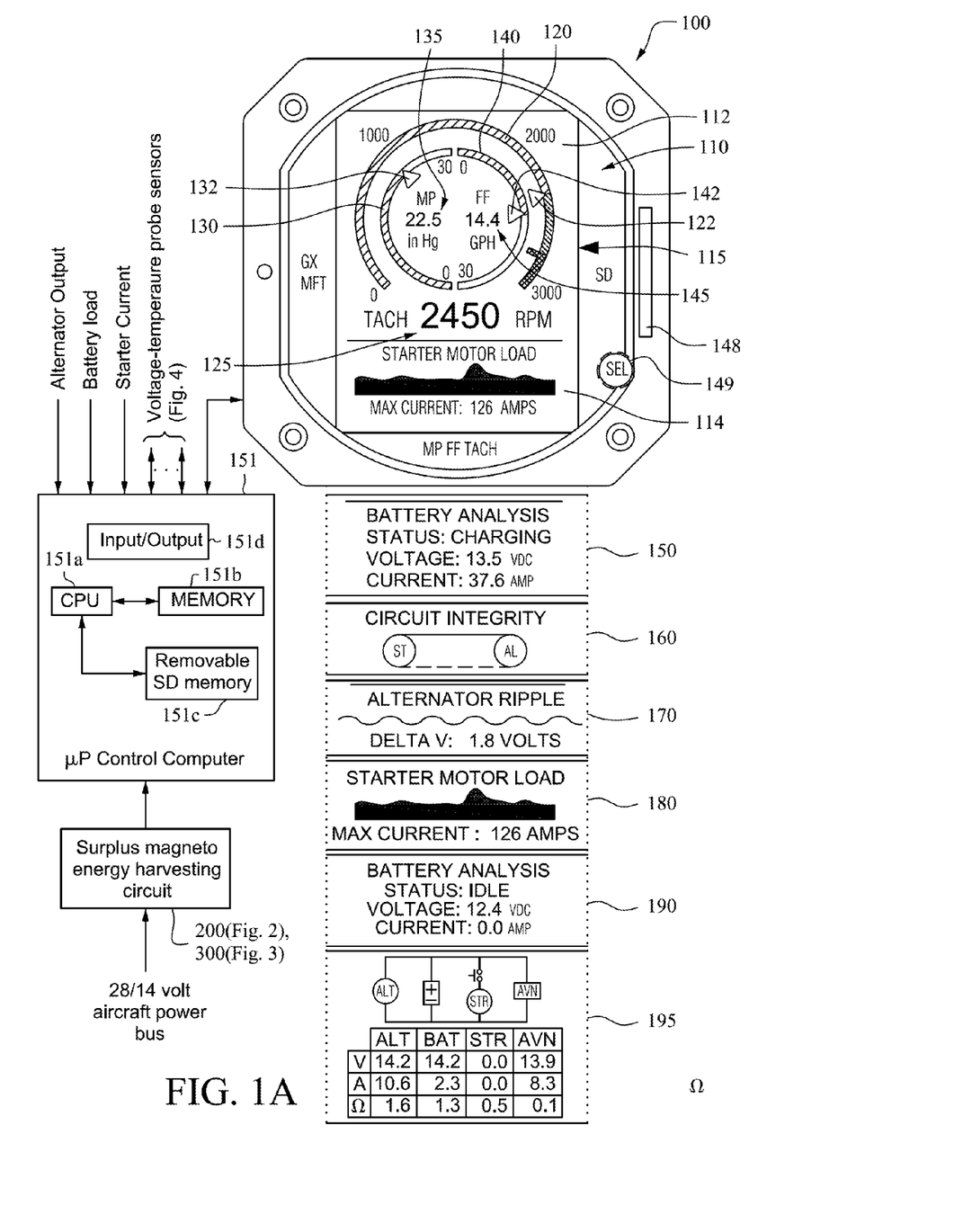
FIG. 1A is a schematic depiction of an exemplary aircraft instrument incorporating a magneto P-lead energy harvesting circuit including a depiction of a display screen thereof and several exemplary selectable electrical system information display screen areas.

The example aircraft instrument 100 shown in FIG. 1A includes a tachometer display as well as displays for manifold pressure and fuel flow in an area 112 for display of engine operating parameters on display screen 110. The aircraft instrument 100 also includes an electrical system analyzer display area 114 which may be selectively changed via the SEL switch 149 to include any of the alternate electrical system displays 150, 160, 170, 180, 190, 195. Display screen 110 may also include a full page display 115 including both engine display area 112 and electrical system display area 114. In an example, engine display 112 may be considered a main page and the electrical system display area 114 may be considered a sub page.

Engine display area 112 depicts manifold pressure, fuel flow and engine revolutions per minute in circular gauge format. Electrical system display area 114 can selectively depict one of several charts, measurements and other information related to the electrical system of the aircraft. Engine display area 112 is positioned above electrical system display area 114; however, those skilled in the art will recognize that engine display area 112 and electrical system display area 114 may have their positions reversed. Further, engine display area 112 and electrical system display area 114 may be positioned side-by-side.

The tachometer display for indicating engine revolutions per minute includes circular bar 120 and arrow 122 which moves along the circular bar to indicate the engine speed. A digital readout 125 for the tachometer is positioned below circular bar 120. These conventional displays of tachometer, manifold pressure and fuel flow are preferably scaled and colored (e.g., green for normal, yellow for caution and red for prohibited operational limits) to match the aircraft OEM instruments. The tachometer can be configured to identify the engine run-up process prior to aircraft take-off (e.g., RPM after engine start up not yet moved above a threshold close to a full throttle take off power setting) and to display and hold the drop in RPM for operation while using only the left magneto and while using only the right magneto (as part of the traditional pre-takeoff checklist procedures). This may remain on the display until the tachometer exceeds some preset threshold indicating that the aircraft is now progressing to actual take-off RPM (whereupon, of course, the tachometer again displays actual engine RPM).

The manifold pressure display includes semicircular bar 130 and arrow 132 which moves along the semicircular bar to indicate the pressure inside the intake manifold of the engine. Opposite semicircular bar 130 is positioned semicircular bar 140 and arrow 142 which moves along the semicircular bar to indicate the rate of fuel consumption. As shown in FIG. 1A, semicircular bar 130 and semicircular bar 140 are arranged opposite one another so that together they form a generally circular arrangement which is positioned concentrically with circular bar 120 of the tachometer display. Digital readout 135 for the manifold pressure display and digital readout 145 for the fuel flow display are positioned inside the circular arrangement formed by semicircular bar 130 and semicircular bar 140.

Those skilled in the art will recognize that either of circular bar 120, semicircular bar 130 and semicircular bar 140 may be a full circle or an arc length less than a full circle. Additionally, semicircular bar 130 and/or semicircular bar 140 may be positioned inside or outside of circular bar 120. It will be recognized that arrows 122, 132 and 142 may have a different shape and may generally be considered indicators. Further, engine display 112 may display information related to engine components other than those described above. It is also noted that although engine display 112 described above includes three informational displays, the engine display may include less than three informational displays (e.g., a single informational display or two informational displays).

Figure 6:
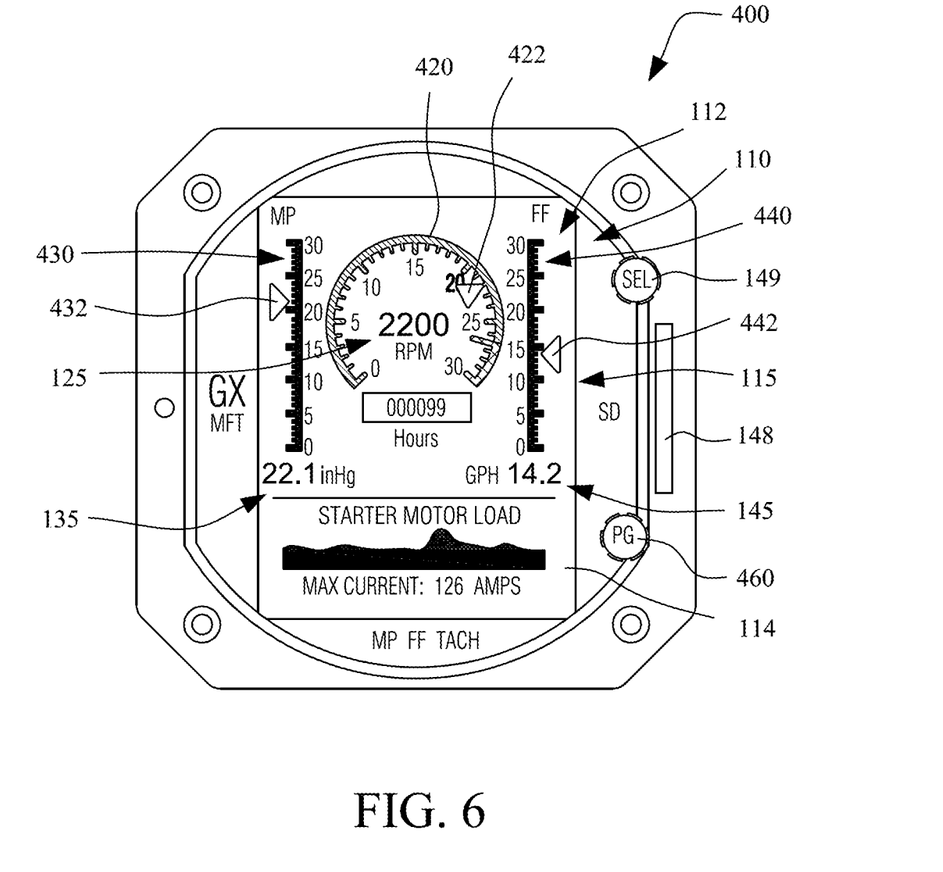
FIG. 6 is a schematic depiction of another exemplary aircraft instrument including a depiction of a display screen thereof.

In another exemplary aircraft instrument 400 shown in FIG. 6, instead of circular bar 130, the manifold pressure display may be indicated with linear bar 430 and arrow 432. Similarly, the fuel flow may be indicated with linear bar 440 and arrow 442. Linear bar 430 and linear bar 440 may be positioned on opposing sides of display 110. Circular bar 420 and arrow 422 may be used to indicate engine speed and may be positioned between linear bar 430 and linear bar 440. Different display screens or "pages" can be selected by manipulating the "PG" knob 460.

Electrical system display area 114 on display screen 110 can be selectively cycled through several screens which form part of an electrical system analyzing tool that is driven by at least one microprocessor (µP) control computer 151. As shown in FIG. 1A, the µP control computer 151 may typically include a central processing unit (CPU) 151a, internal memory circuits 151b, a removable SD memory chip 151c and input/output circuits 151d. As those in the art will appreciate, the µP 151 may take many forms including an application specific integrated circuit (ASIC), programmed logic array (PLA), etc.

Figure 2:
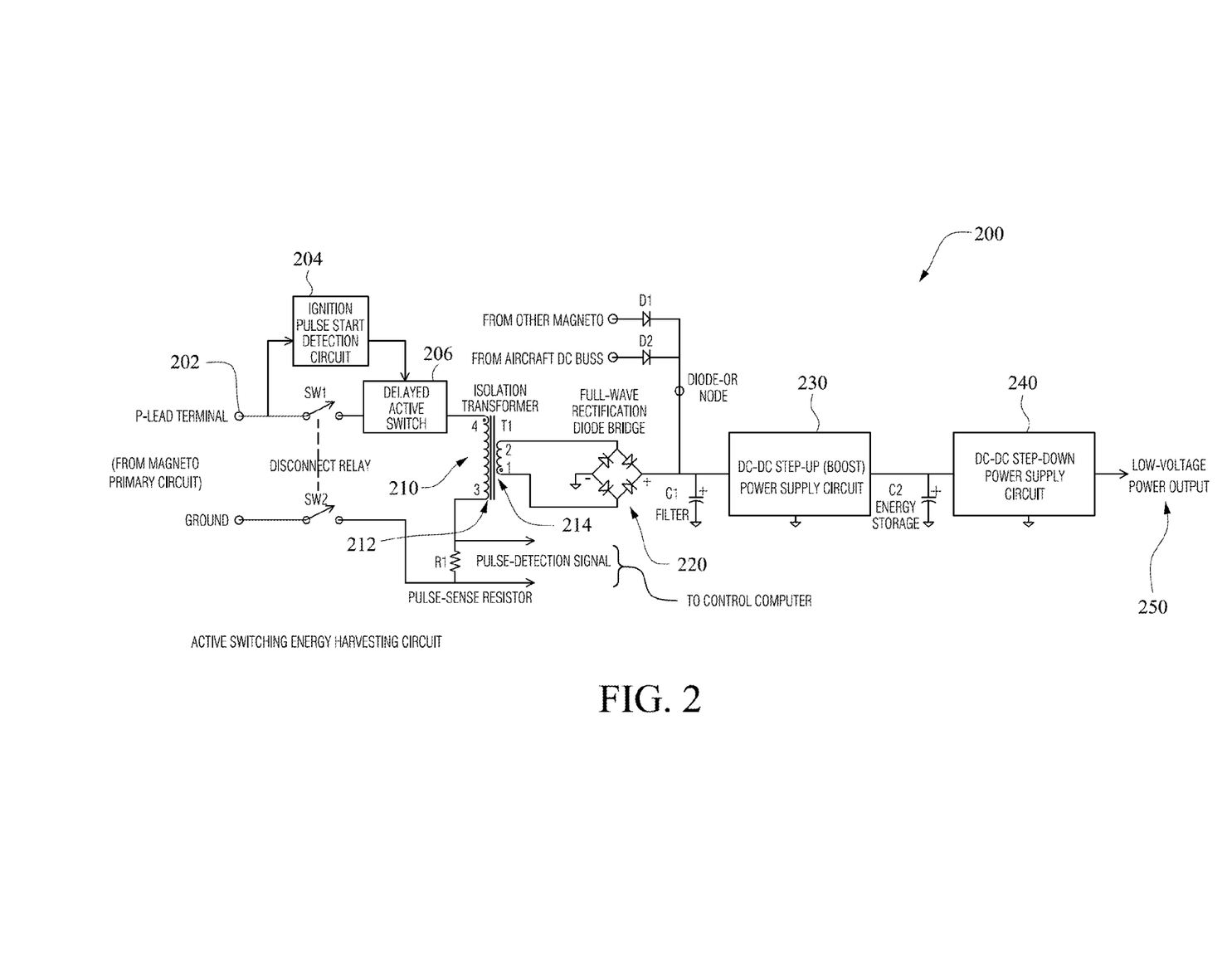
FIG. 2 is a schematic diagram of an example active switching magneto P-lead energy harvesting circuit.

Electrical power is supplied to instrument 100 via the surplus magneto energy harvesting circuit (200 shown in FIG. 2 or 300 shown in FIG. 3) which also passes the normal 28/14 volt aircraft power supply bus voltage therethrough in normal circumstances when emergency backup power is not needed.

As also depicted in FIG. 1A, in addition to driving the visual output display screen 112, and accepting inputs from the SEL switch 149, the µP control computer 151 has its input/output circuits 151d connected to interface with and control an array of voltage-temperature probe sensors as well as current probes monitoring such things as alternator output, battery load, engine starter current, etc.

The instrument 100 preferably provides an electrical system analyzer and troubleshooting tool. Aircraft operators/pilots often have electrical problems which are hard to find and hard to fix. Service people often do not know how to deal with them either. There is typically next to nothing in the typical airplane itself to handle this analysis properly. It is even difficult to tell when the battery is no longer good.

Figure 1B:
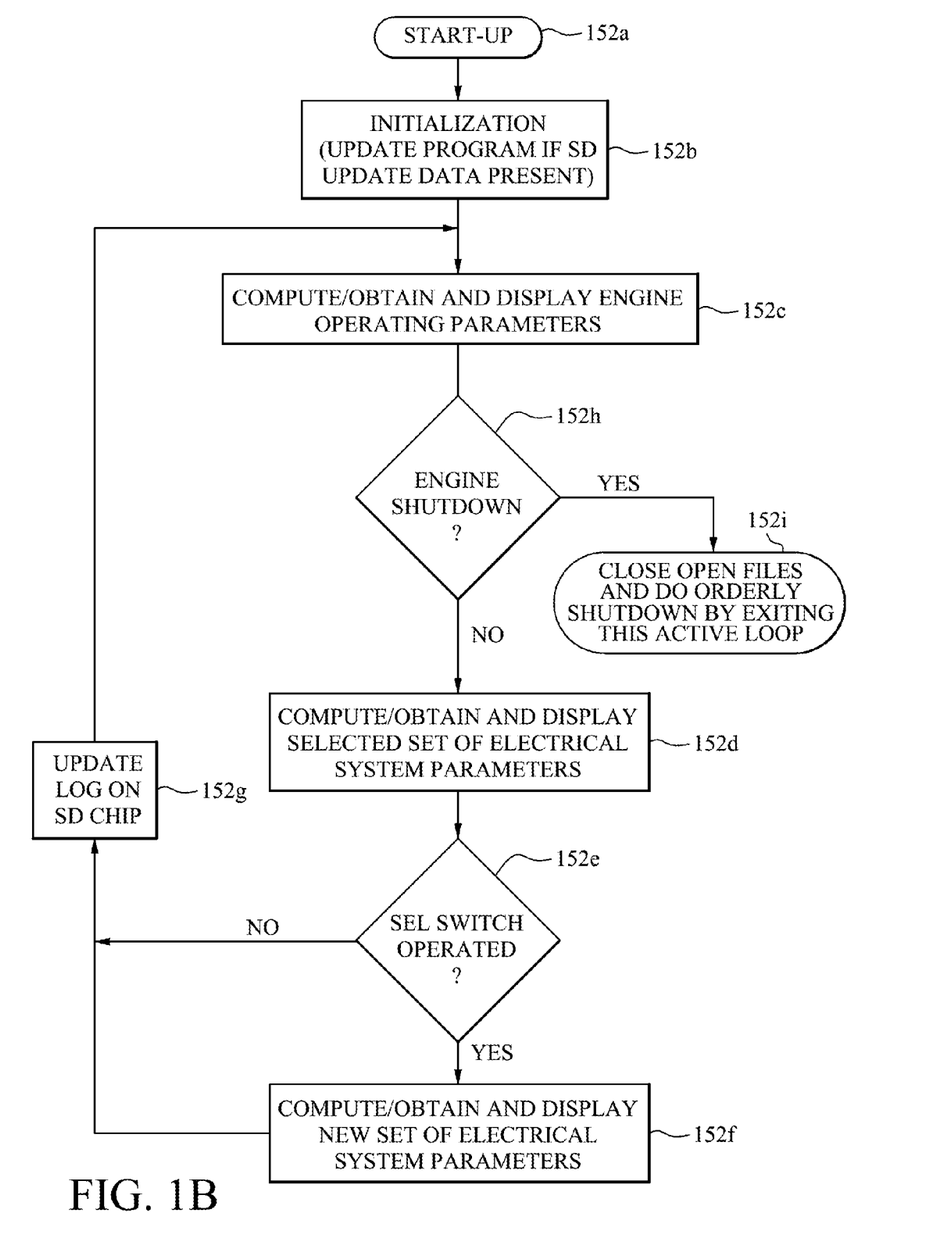
FIG. 1B is a schematic depiction of computer program code structure for execution by the microprocessor of the exemplary FIG. 1A instrument.

A schematic depiction of an instrument system operating system controlling computer program code structure for µP 151a (e.g., as stored in memory 151b and/or 151c) is shown in FIG. 1B. After startup at 152a, the microprocessor enters initialization processes at 152b. Here, if present, new program updates also may be accomplished from the SD memory medium.

At 152c, an operating loop is entered and current engine operating parameters are computed (if necessary), obtained and displayed. If engine shut down is detected at 152h, then the program is exited in an orderly way at 152i. Otherwise, during normal operations, so long as the engine is running, at 152d the currently selected set of electrical system parameters are computed (if necessary), obtained and displayed. A test is made at 152e to see if the SEL switch has been operated. If not, then the data log (e.g., on the removable SD memory medium) is updated at 152g and control is returned to 152c.

If the SEL switch has changed state as tested at 152e, then at 152f the newly selected set of electrical system parameters are computed/obtained and displayed before control is passed back to the main operating loop via the log update block 152*g* (where the current engine operating parameters and electrical system parameters are recorded, typically in the removable SD memory media so such can be removed and displayed/analyzed out of the aircraft in another computer).

Figure 12:
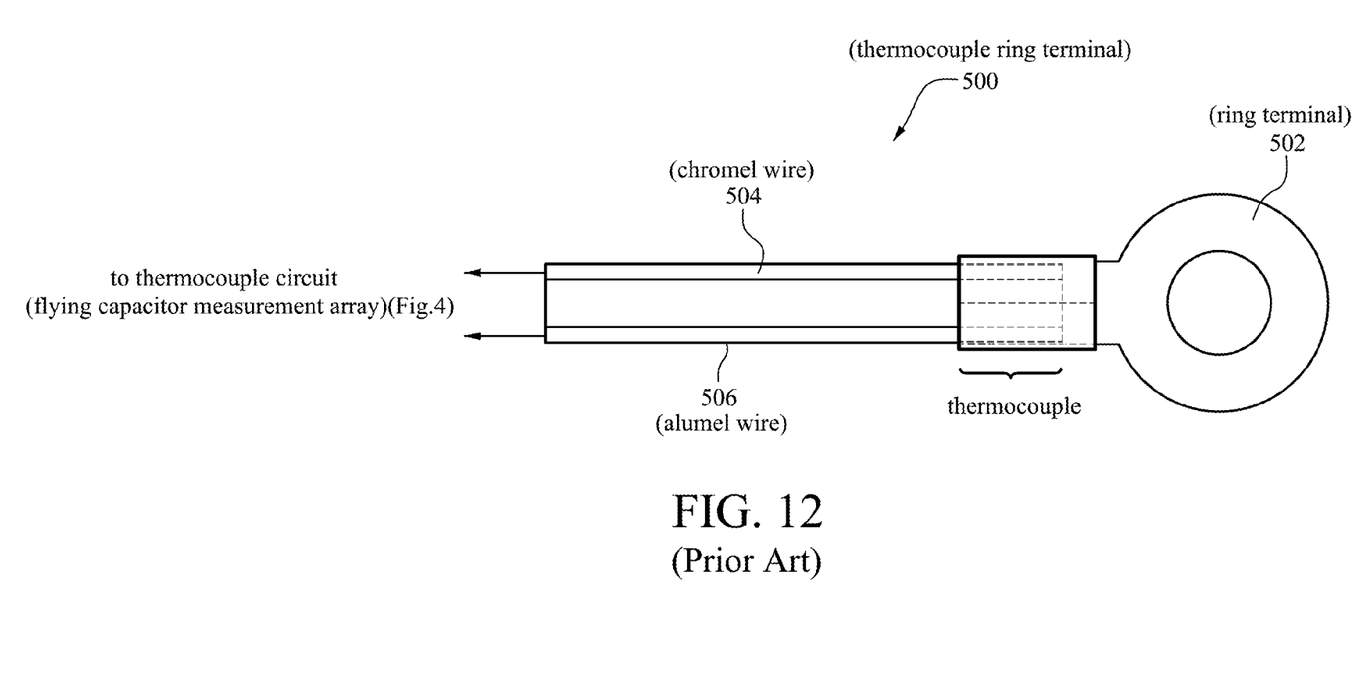
FIG. 12 is a side view of an example conventional thermocouple ring terminal used to measure voltage and temperature in accordance with an example of the disclosed technology.

The exemplary instrument is fundamentally simple. It measures two currents, several voltages and temperatures and analyzes the results. As explained elsewhere herein, the exemplary instrument uniquely uses a combination voltage-temperature probe array. The thermocouple ring terminal 500 itself is conventional and terminates in a simple ring terminal 502, as shown for example in FIG. 12. Ring terminal temperature sensors are common and convenient because they may be screwed down to whatever you want to measure for temperature and/or voltage. Here, such will be used to measure either or both voltage and temperature. The thermocouple ring terminal 500 may be a type K thermocouple including a chromel wire 504 and an alumel wire 506.

Temperature is reported as the small thermocouple voltage is measured differentially on the wire pair connected to a given thermocouple junction. Thermocouples deliver small mV level signals. If one is mounted on the alternator output terminal it will have a common mode voltage on it equal to the alternator output voltage. While not unmanageable, this voltage swamps the mV thermocouple level making measurements challenging. But with the right circuitry (e.g., shown in FIG. 4) one can measure both temperature and alternator voltage over the same wires. This reduces complexity and installation time and cost.

The electrical output screen displays may include battery analysis screen 150, circuit integrity screens 160, 195, alternator ripple screen 170, starter motor load screen 180 and a battery performance history screen (not shown). Select (SEL) button switch 149 may be used by an operator to cycle through the available electrical system output screens. Any one of the electrical output screen displays (e.g., circuit integrity screen 195) may be displayed over an area (e.g., full page display 115) comprising both engine display area 112 and electrical system display area 114 for better viewing.

The electrical system analyzing tool may be configured to measure at least two currents and several voltages and temperatures in and around the aircraft engine(s) system(s). The analyzing tool is further configured to analyze and display the results. The engine and electrical system of the aircraft typically includes, among other items, a piston engine block, an engine starter, a battery, a battery charger alternator, and an avionics power supply bus.

Figure 11A:
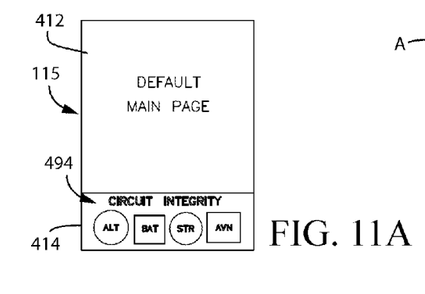
FIGS. 11A and 11B are depictions of several exemplary selectable full page and sub page screens relating to analysis of the integrity of the aircraft's electrical system.
Figure 11B:
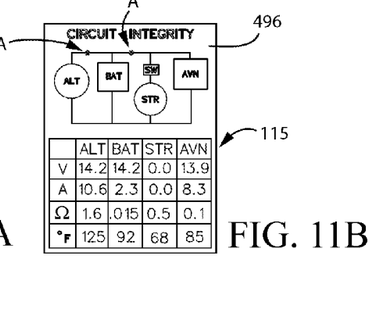

The electrical system analyzing tool includes a current sensor (e.g., ammeter A as illustrated in FIG. 11B) on the alternator output and a current sensor (e.g., ammeter A as illustrated in FIG. 11B) on the load path of the battery. The difference in these currents will indicate the current going to the battery and thus battery impedance. If impedance is higher than a predetermined value, an indicator may signal that a new battery is needed. If impedance is within a predetermined value, an indicator may signal that there is no problem with the battery. Such predetermined values may be stored on μP control computer 151.

If the alternator is not producing more power than the load current, it can be assumed that the battery is being depleted. It is, of course, being depleted during engine start. Further, by integrating the difference current, the amount of energy lost during engine start and the amount of time it takes to replace the energy can be determined. If under heavy loads, the current balance is only slightly negative, it can be assumed that the battery will soon be dead. When an alternator diode fails or fails intermittently at high temperature, the alternator may keep up with modest loads but if one turns on the pilot tube heater (and/or the propeller heater), you may have a dead battery before you know it.

If the AC component of alternator charge current is measured and displayed, the increased ripple current caused by a bad diode will be revealed. Even normal ripple current will increase at increased loads. Therefore, diode diagnosis will require taking total load and total ripple into account. For example, a predetermined value for the ripple current at a given load may be stored on μP control computer 151. Alternatively, a predetermined acceptable value for ripple current may be calculated as a percentage of total current.

A "diode bad" indication is revealed if the ripple current is excessive for a given load current. Further, the voltage drop and current draw from the battery during engine start can be measured to determine the battery's impedance to aid in determining when the battery will need to be replaced.

Figures 7A, 7B, 8A, 8B, 8C:
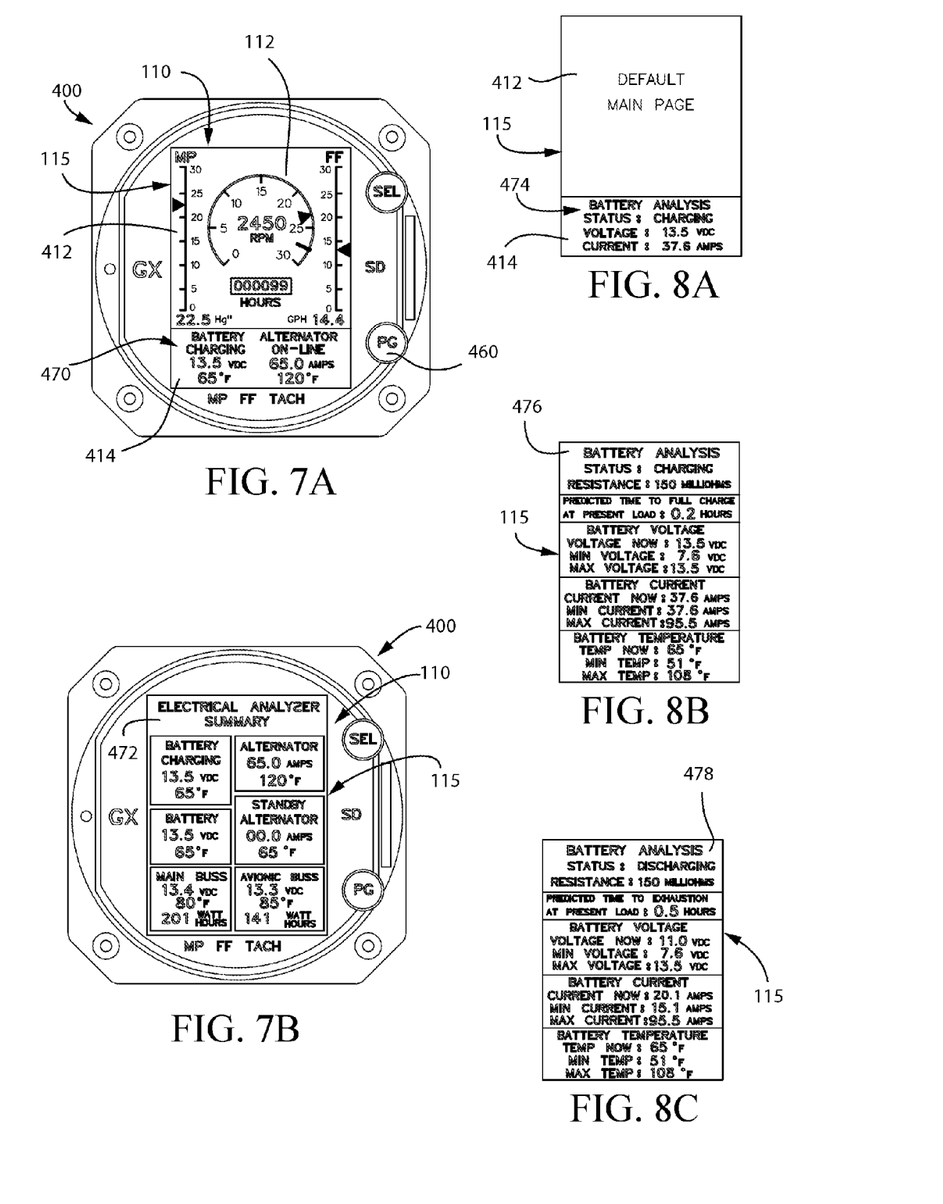
FIGS. 7A and 7B are schematic depictions of another exemplary aircraft instrument including a depiction of a display screen thereof and several exemplary selectable full page and sub page screens.
FIGS. 8A to 8C are depictions of several exemplary selectable full page and sub page screens relating to analysis of the battery.

If voltage drop (E) and current draw (I) during engine start are measured, the battery impedance (R=E/I) can be determined and the possible need for battery replacement can be identified. R in this case is voltage drop/current. Battery analysis screen display 150 may indicate the voltage and current output of the battery as well as the status (e.g., charging or idle as shown in battery analysis screen 190). In addition to battery analysis screens 150, 190, battery analysis "charging" full page 476 and battery analysis "discharging" full page 478 may be displayed, as shown in FIGS. 8B and 8C. These displayed pages/screens 476, 478 indicate battery impedance (resistance) as well as voltage, current and temperature information of the battery.

The electrical system analyzing tool may also include a battery history screen (not shown) that will utilize stored data from previous engine starts. Each start event will contribute one set of data points on a graph showing starter event parameters versus successive starter events (i.e., a graphical history of monitored starter event parameters). Each set of points may include, for example, battery impedance at peak current, battery temperature, peak start current, minimum start voltage, start duration, and engine block temperature. This graph then is like an index into a complete data set for any engine start.

The displays may all be color coded to indicate information as well. For example, predetermined values for various parameters (current, temperature, voltage, resistance, etc.) may be stored in μP control computer 151 and appropriate color-coding applied when measured values are outside of predetermined limits. In an example, circuit integrity display 160 may show the upper connection from starter motor ST to alternator AL in green (i.e., "ok") while the lower connection is shown in red (i.e., "not ok") as indicated by a dotted or dashed line in this black-and-white drawing. Caution parameter values may be indicated by yellow, normal by green and abnormal by red (e.g., the starter motor load current graph in display 180 may be shown in all red if determined to be beyond predetermined limits for starting conditions. Of course, values that are outside of predetermined limits may be indicated in other ways, such as by activation of a light, readable message, etc. The circuit integrity screen may additionally show connections between alternator ALT, battery [+−], starter motor STR and avionics bus AVN, as shown at 195 in FIG. 1A. Circuit integrity screen 195 may display measured or calculated parameters for voltage (V), current (amps (A)) and resistance (ohms (Ω)) for each of the alternator, the battery, the starter motor and the avionics bus. By measuring voltage and current at various points in the system, connection resistances can be calculated and displayed. When high currents are flowing in the circuit, very low resistances can be measured. Predetermined values (e.g., 0.075 to 0.125 ohms, or, 0.1 ohms) for resistance may be stored in μP control computer 151 so an indication on display screen 110 may be made when a value exceeds a predetermined value. By measuring temperature at connection terminals, loose connections can be discovered by temperature rise especially during high current draw engine start intervals. The data can be logged for review/analysis at a later time (e.g., by removal on a removable memory device for analysis/viewing in another computer environment).

Another displayed screen may look like a simplified schematic showing alternator, battery, starter, engine, avionics bus, etc. The voltage, current, current direction, connection resistance, etc. may then be displayed for trouble shooting.

Much can be learned during the high load conditions of the engine starter (e.g., 100-200 amps or more). It takes very little resistance in the circuit to diminish performance or cause trouble; however, such magnitude is well below what can be measured with an ordinary multimeter. The voltage drop at, for example, 200 amps is a different story. The engine start interval (a few seconds) can be logged as a set of data that can be referred to later. Battery voltage, starter voltage, start current, battery and starter terminal temperature, engine block temperature, engine rpm, start time can all be used to evaluate performance. Start energy, battery impedance and connection resistances can be calculated. These measurements/values can be graphed and compared with starts from previous flights (e.g., years prior). Faults could be identified on circuit integrity display 160, 195 by color-coding (e.g., showing high resistances or low voltages in red). All previous starts can be scanned to develop a min/max graph on any or all parameters, measurements or values. For example, starter current could be chosen which would look like a quick rise to peak start current and then a tailing off as the engine accelerates and then drops to zero when the starter is turned off. A max graph would show above this curve somewhat parallel. High current starts would also be longer (assuming that the current engine start is not the highest current one). An average curve could be plotted or an operator could select only starts that began with similar engine temperature, for example. Engine starts are typically longer when the engine is cold. Some parameters like start energy in Joules may be expressed as a single number per start and may be plotted together with other engine starts. Other parameters, such as start time, peak current, peak voltage drop, peak resistance, lowest battery voltage, battery impedance may also be expressed as single values per start. Any combination of single value parameters could be plotted from a group of flights. This level of detail is unprecedented in an airplane. A lot can be determined from a few wires with ring terminals (sensors) under the engine cowling.

A log file for each engine start event can be made available to view. If something of interest is noted, then one can view all the details. As an example, an engine start may indicate a very low start voltage and also a cold battery and a long start duration which may justify the low start voltage. However, a closer look at the expanded details of the engine start event may reveal a connection problem by analysis of the starter voltage, battery voltage and starter connection resistance.

By measuring starting current, one may also obtain an indication of engine compression. In two revolutions, all six compression strokes of a typical 4-stroke per combustion cycle, six cylinder engine are tested. Ideally, this would be done by cranking the engine with the starter motor but with the fuel mixture cut off so that the engine would not start. A first portion of engine revolutions during such test cranking can be ignored until the engine reaches a somewhat stable crank speed. By looking at peaks in current during stable crank speed, one can identify the compression intervals. By timing such intervals, one can derive the crank speed. Then some slope compensation could be applied to accommodate engine acceleration if the crank speed is not constant. The slope could be derived by measuring peak current of successive strokes of the same cylinders. The relative compression of the various cylinders can thus be derived, logged and displayed.

A flight timer display screen may show flight time based on RPM above 2000 to start timing and below 2000 to stop. The timer could be configured to function automatically with no pilot intervention required. Also, a tach time display may be provided which may calculate tach time from RPM, similar to a mechanical tach.

The electrical system analyzing tool may measure the AC component of the alternator charge current (i.e., the "ripple" riding on the desired DC alternator output). The result may be displayed on alternator ripple screen 170. This display may help a pilot quickly recognize that an alternator diode has failed by analysis of the increased ripple superimposed onto the alternator output DC current. The electrical system analyzing tool may be configured to analyze the degree (e.g., percentage) of ripple in the current and determine whether the ripple is excessive for a given load current. If the ripple is determined to be excessive, instrument 100 may include a controlled visual light or symbol (e.g., on alternator ripple current screen 170) to indicate a failed diode.

μP control computer 151 may drive display screen 110 in conjunction with the electrical system analyzing tool to display a variety of screens in addition to the battery analysis screen 150, circuit integrity screens 160, 195, alternator ripple screen 170, starter motor load screen 180 and a battery performance history screen (not shown) described above. For example, display screen 110 may include a main page 412 and a sub-page 414, as shown in FIG. 7A. Full page display 115 includes the main page 412 and the sub-page 414. Engine display 112 including engine speed, manifold pressure and fuel flow may be set as a default main page, as shown in FIG. 7A. Electrical analyzer summary sub-page 470 may be set as the default sub-page 414. Additionally, PG switch 460 may be used to display electrical analyzer summary full page 472, as shown in FIG. 7B. Electrical analyzer summary full page 472 may display the voltage and temperature of the battery, current and temperature of the alternator, as well as voltage, temperature and watt hours of the main and avionics busses.

FIGS. 8A to 8C show several screens related to the aircraft's battery. As shown in FIG. 8A, battery analysis sub page 474 displays a status of the battery as well as voltage and current. FIGS. 8B and 8C show full page battery analysis screens respectively for a charging condition and a discharging condition of the battery. Battery analysis "charging" full page 476 indicates a time to full charge at present load, whereas battery analysis "discharging" full page 478 indicates a time to exhaustion at present load.

Figure 9A:
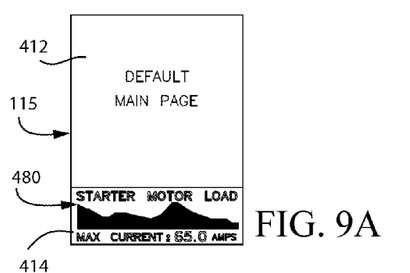
FIGS. 9A and 9B are depictions of several exemplary selectable full page and sub page screens relating to analysis of the starter motor.
Figure 9B:
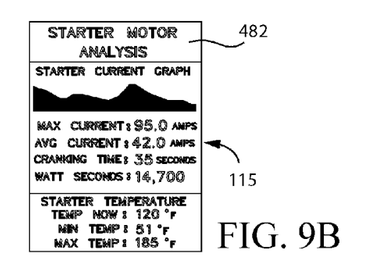

FIGS. 9A and 9B show several screens related to the aircraft's starter motor. As shown in FIG. 9A, starter motor sub-page 480 may graphically indicate current for the starter motor. Starter motor cranking event full page 482 may indicate cranking time, maximum and average current as well as temperature measurements for a particular cranking event, as shown in FIG. 9B.

Figure 10A:
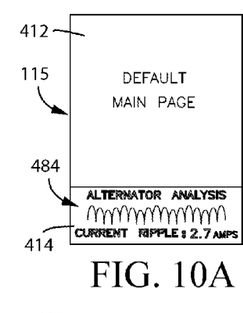
FIGS. 10A to 10E are depictions of several exemplary selectable full page and sub page screens relating to analysis of the alternator.
Figure 10B:
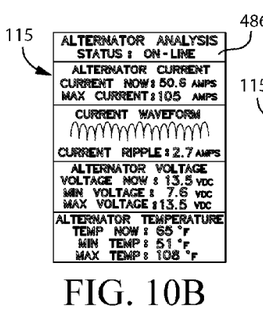
Figure 10C:
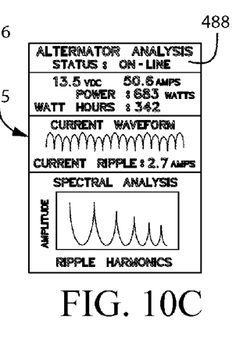
Figure 10D:
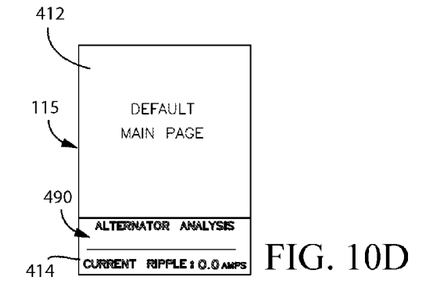
Figure 10E:
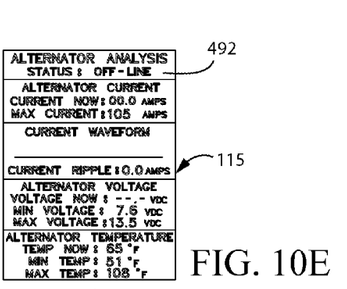

FIGS. 10A to 10E show several screens related to the aircraft's alternator. As shown in FIG. 9A, alternator ripple sub-page 484 may display the AC component of the alternator charge current (i.e., the "ripple" riding on the desired DC alternator output). Alternator analysis full page 486 and alternator spectral analysis full page 488 may display current, voltage and temperature measurements of the alternator in an on-line condition, as well as watt hour usage, as shown in FIGS. 10B and 10C. Alternator spectral analysis full page 488 may also include a graph representing amplitude of the ripple harmonics. Referring to FIGS. 10D and 10E, off-line measurements may be displayed in alternator analysis off-line sub page 490 and alternator analysis off-line full page 492.

FIGS. 11A and 11B show several screens related to the integrity of the electrical circuit comprising alternator ALT, battery [+−], starter motor STR and avionics bus AVN. Circuit integrity sub page 494 may display symbols representing these components and may be color-coded, as described above, to convey information to the pilot, e.g., green for "ok" and red for "not ok". Referring to FIG. 11B, circuit integrity full page 496 may display measured or calculated parameters for voltage (V), current (amps (A)) and resistance (ohms (a)) for each of the alternator, the battery, the starter motor and the avionics bus, as described above with reference to circuit integrity screen 195. As shown in FIG. 11B, temperature may also be measured and displayed. Additionally, circuit integrity full page 496 may show connections between alternator ALT, battery [+−], starter motor STR and avionics bus AVN, as described above with reference to circuit integrity screen 195. The ammeters A shown in FIG. 11B are for illustration purposes and may optionally be displayed on circuit integrity full page 496.

Figure 4:
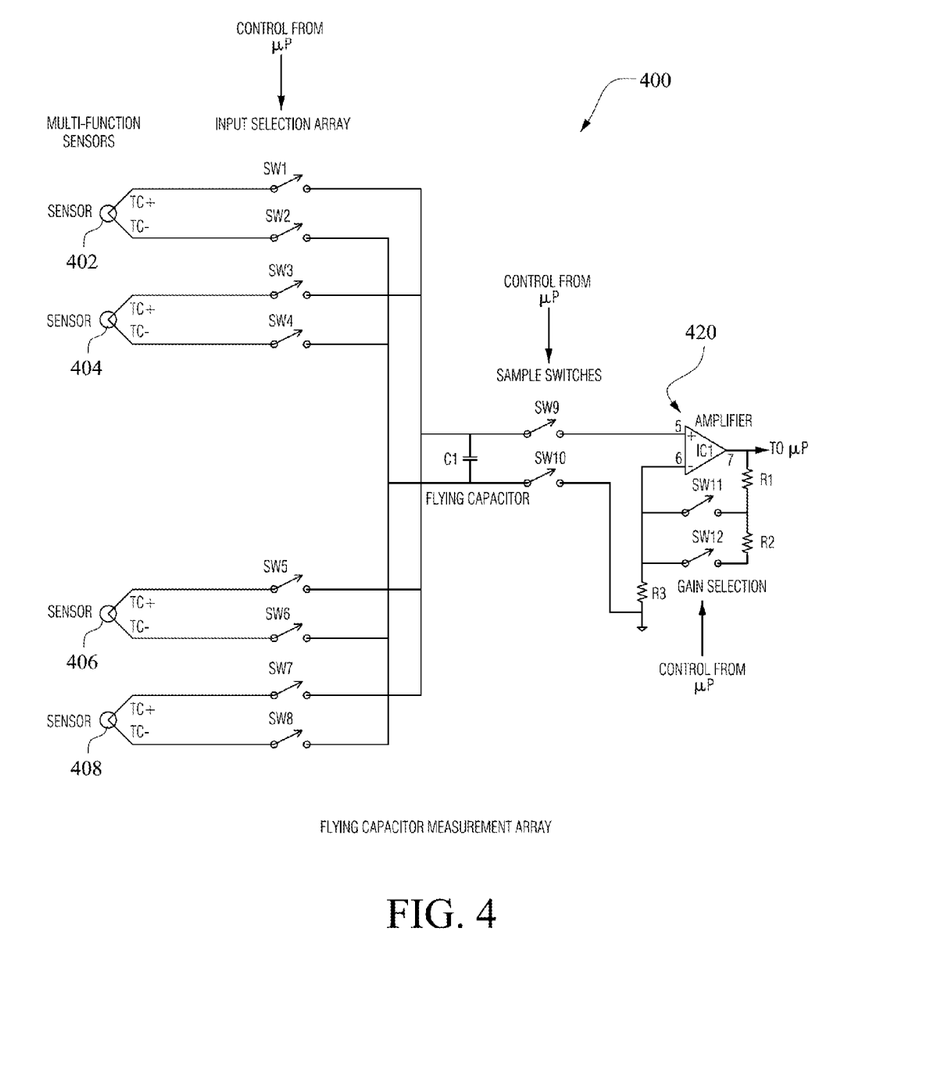
FIG. 4 is a schematic diagram of an example flying capacitor measurement array that may be employed in the exemplary embodiments for measurement of various aircraft electrical system parameters.

FIG. 4 schematically depicts an array of thermocouples operating as multi-function sensors. Voltage and temperature may be measured separately or by a single probe (e.g., a voltage-temperature probe (thermocouple 500 (FIG. 12))). Voltage-temperature probes may be mounted on the output terminal of the alternator, the engine block, the starter terminal, the avionics bus, and the pilot tube de-ice current load, etc. Analysis of such voltage measurements may indicate when high current electrical conduction lines are loose, corroded or defective.

The measurement circuitry must cope with some unusual requirements. For example, the thermocouples will often be at low temperatures and produce a signal level below 1 mV. That signal may be riding on a 28V bus voltage with 1 volt or so of AC ripple on it. Successful temperature readings will depend on micro volt measurements in the presence of huge common mode signals. Enormous common mode rejection will be required to read stable temperatures. The magnitude of this problem is beyond what most differential instrumentation amplifiers will cope with.

A modernized flying capacitor multiplexor is used but in an unusual way. To precisely resolve such small signals, the circuit shown in FIG. 4 employs optically coupled dual MOSFET switches SW1 to SW8 to precisely resolve the low voltage signals. The MOSFET switches provide the extraordinary isolation required without interference from charge injection.

Two MOSFET switches (e.g., SW1, SW2) are controlled to selectively connect sampling capacitor C1 to thermocouples 402, 404, 406, 408. Using switches SW1, SW2 as an example, capacitor C1 charges to the potential of thermocouple 402, and then switches SW1, SW2 are opened thereby isolating capacitor C1 without disturbing its charge. Once switches SW1, SW2 are open, sampling switches SW9, SW10 operate together to briefly connect capacitor C1 to the amplifier input to take the measurement quickly before any appreciable charge is lost on capacitor C1. The capacitor has only the thermocouple differential voltage on it, which is what is to be measured. Feedback resistors R1, R2 across the amplifier control the gain depending upon which resistor is switch selected (by switches SW11, SW12) (or both switches SW11, SW12 may be closed so that the parallel resistance of the two resistors R1, R2 determines gain).

Other thermocouples are measured in similar fashion with their own pair of connecting switches. A processor (e.g., μP 151) individually controls all of the switches in the flying capacitor multiplexor system.

Flying capacitor measurement array 400 may also be used to make differential measurements of common mode voltages (e.g., on the battery, alternator and starter). In particular, the switches may be used in different combinations (i.e., rather than in pairs associated with only one thermocouple) to achieve this. For example, SW1 and SW4 could be selectively closed to connect capacitor C1 to opposite sides of thermocouple sensors 402 and 404. Nevertheless, the modified different combination of operated switches still puts a charge on the capacitor and then measures the voltage across the capacitor (e.g., if SW1 and SW4 are closed, then the voltage impressed across sampling capacitor C1 would be TC+ at sensor 402 referenced to TC− at sensor 404).

Such different combinations of switch actuations can be used to measure voltages at any point in the system (having a thermocouple sensor connected thereto) relative to any other such point—or it can be used to measure differences directly. For instance, if a switch on the alternator output terminal and another switch on the battery positive terminal are activated, the voltage lost in the connection between the two can be measured. One could also select the battery minus terminal as the reference point and then make measurements from (i.e., relative to) that point. By activating a complementary set of switches to the different thermocouples, one can also reverse the charge on the capacitor and thus invert the polarity of the measurement. The system is also well suited to measure pre-existing high side current shunts that typically deliver 50 mV at full scale load.

Instrument 100 may include a memory card slot 148 to receive a removable memory card 151c (e.g., a secure digital (SD) card). The removable memory medium can be used to store data in instrument 100 (e.g., logged history data which can then be removed and separately analyzed/viewed in another computer environment). It can also be used to store updated programming code downloaded thereto while removed (and inserted into another computer environment connected to the internet) and then inserted back into instrument 100 for uploading/updating new/previous program instructions stored in memory 151 lb.

Aircraft piston engines are typically designed with two independent ignition systems. Such ignition systems comprise two aircraft spark plugs per cylinder as well as left and right magnetos. The left magneto fires one plug per cylinder, while the right magneto fires the other plug. This arrangement produces a smoother and more complete combustion of the fuel mixture, while also providing ignition redundancy in the event one magneto fails.

Figure 5:
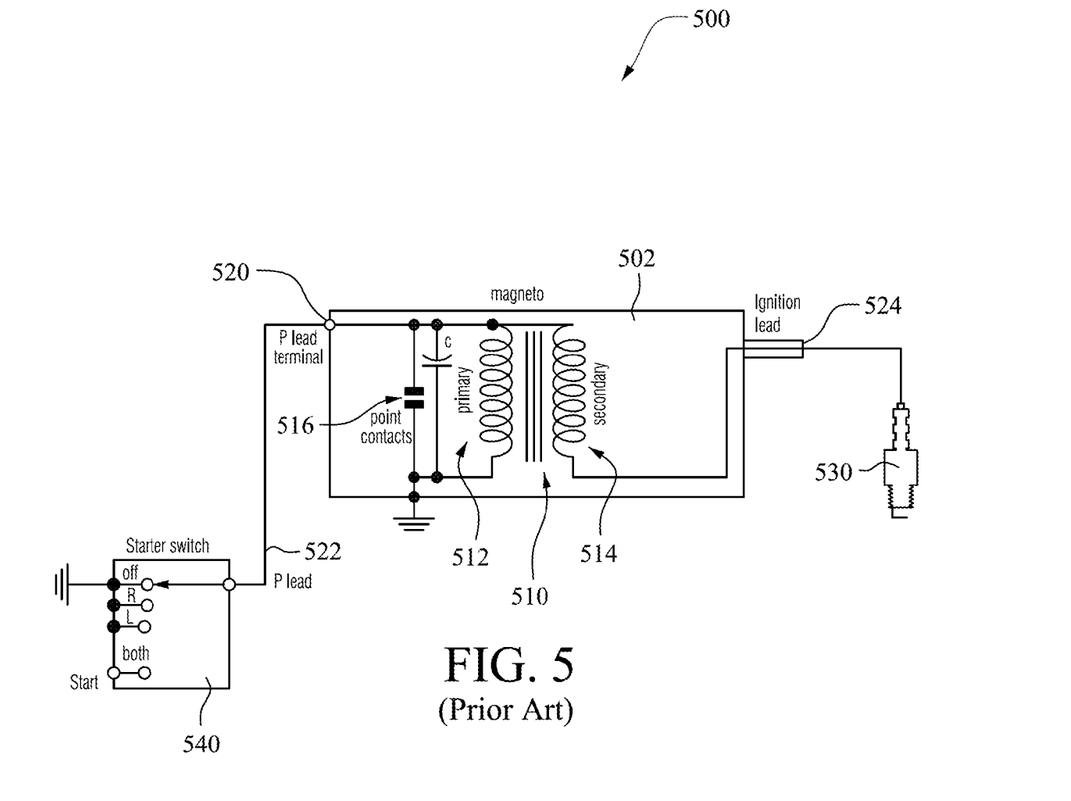
FIG. 5 is a schematic diagram of a conventional magneto circuit.

A simplified schematic representation of a conventional magneto circuit 500 is shown in FIG. 5. Magneto 502 includes coupling transformer 510 having primary winding 512 and secondary winding 514. As is known, magneto 502 also includes point contacts 516, capacitance C (connected in parallel with the point contacts 516 and primary winding 512) and ignition lead 524. The core is charged with magnetic flux by a spinning magnet (not shown) (driven directly by the engine once it is started) which is then allowed to collapse when points 516 open. The rapidly collapsing flux generates a large voltage spike in that is much larger that would be created by the relatively slow onset of magnetic field by the rotating magnet. Secondary winding 514 is connected to an appropriate spark plug 530 at an appropriate time to produce a combustion ignition spark in a piston/cylinder combustion chamber.

The polarity of the flux alternates as the north and south poles of the magnet sweep by the core. One plug fires positive and the next negative, etc. This alternation of polarity makes a full wave rectification system (described below) beneficial (more efficient).

Primary lead wire (P-lead) 522 of the magneto connects P-lead terminal 520 of magneto 502 to starter switch 540. As P-lead 522 is electrically connected to the primary circuit of magneto 502, the P-lead carries a few hundred volts of alternating current (AC) during an ignition initiation event.

Figure 3:
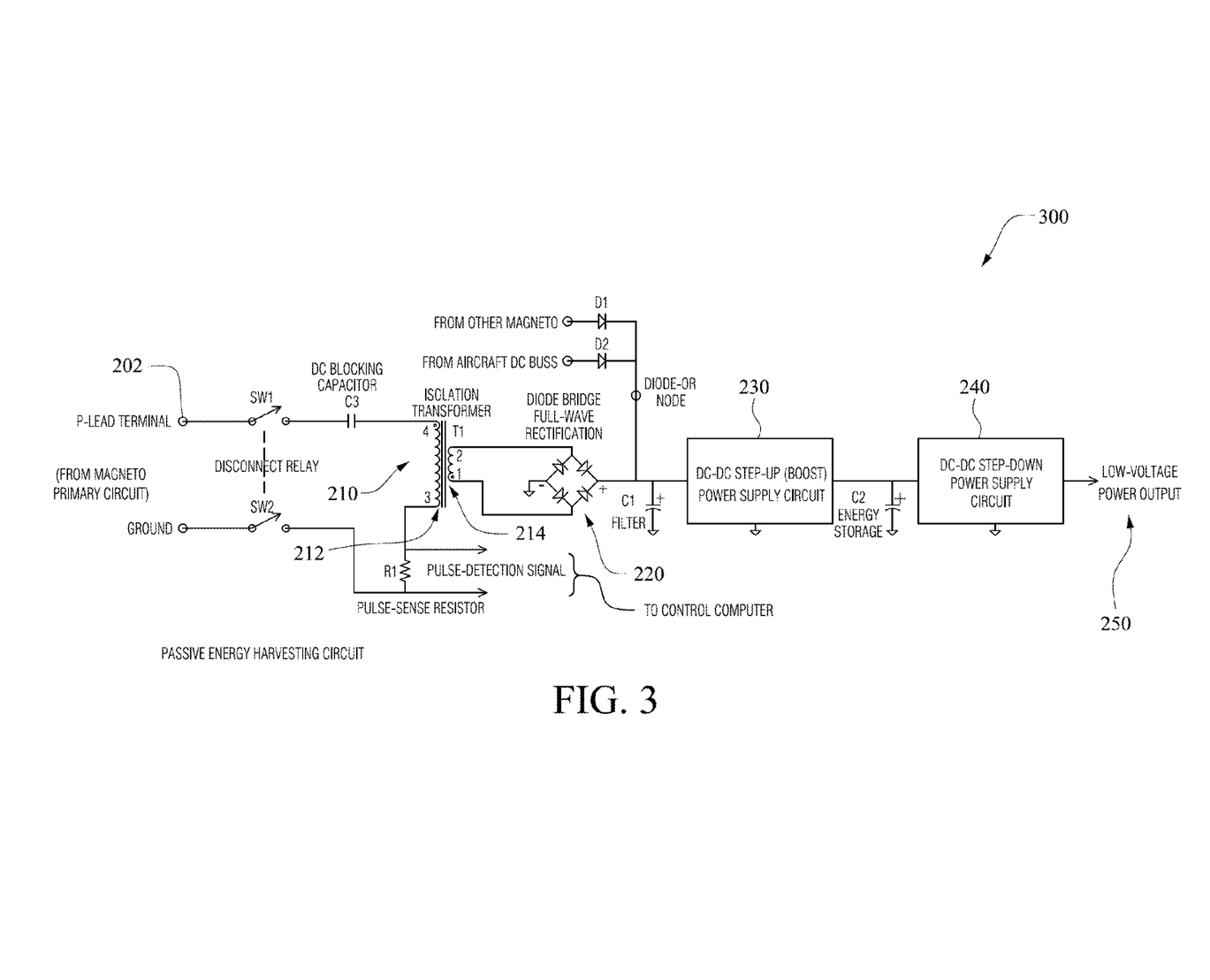
FIG. 3 is a is a schematic diagram of an example passive magneto P-lead energy harvesting circuit.

Instrument 100 is configured to be normally powered by the aircraft's battery-powered electrical system; however, in the event of an electrical failure (e.g., of the battery and/or its recharging alternator(s)), active switching energy harvesting circuit 200, shown in FIG. 2 or, alternatively, passive energy harvesting circuit 300 shown in FIG. 3, is arranged to extract power from P-lead 522 (preferably from each of the two magnetos) to provide back-up electrical power to instrument 100 as long as the engine is running.

Extracting useful energy from a magneto must not, of course, compromise the magneto's essential purpose of firing the spark plugs to keep the engine running Luckily, the ionization characteristics of the spark plug are such that there is unused magneto energy appearing at the P-lead that can be harvested.

An active switching energy harvesting circuit 200 is shown in FIG. 2. It is electrically connected to the P-lead of a magneto (e.g., via P-lead terminal 202). Aircraft engine spark plugs differ little from any other kind. They have two closely spaced electrodes that produce a spark when high voltage is applied. Initially it typically takes tens of thousands of volts to initiate the breakdown needed to generate a spark, but once the path between the electrodes is ionized it becomes highly electrically conductive and the voltage needed to sustain the arc is profoundly less. The high voltage ionization time can often be less than 100 ns. In most cases, the combustion process is fully initiated in the first 20 µs. Although under adverse combustion conditions (too rich or too lean a fuel/air mixture), several hundred us may be required. In any event, the important combustion initiation process is typically over in less than 10% of the time that energy is available on the magneto P-lead. It is now desired to harvest energy only after the combustion initiation process is complete (e.g., after the first 1 ms of time has elapsed since the beginning of an ignition initiation spark generating event) and some exemplary ways to do this are detailed below.

Active switching energy harvesting circuit 200 is designed to harvest energy from the magneto P-lead after the combustion initiation process is complete, to avoid compromising the magneto's essential purpose of firing the spark plugs. Active switching energy harvesting circuit 200 uses dynamic switching to harvest energy from the magneto P-lead after the combustion initiation process is completed (e.g., starting about 10-30% (perhaps 300-1000 µs) after a spark initiating pulse of perhaps 3 ms begins).

In an active switching energy harvesting circuit, a switching element (transistor, TRIAC, SCR, etc.) may be placed in series with the P-lead and a coupling isolation transformer (the isolation transformer may be optional). The switching element is controlled to be "off" during the early combustion initiation time period to allow the combustion initiation process to proceed unencumbered. Then after a suitable time delay, the switching element is turned "on" to harvest energy. As noted above, energy is available for a total of about 3 ms per spark interval. The resulting signal is bipolar AC so simple bridge rectification and capacitive filtering will turn it into DC. The signal is bipolar around ground so a transformer approach provides isolation allowing the negative bridge output to connect to ground. A non transformer approach could generate a plus above ground and minus below ground supply which could be useful as is or shifted to a new ground reference by a switching regulator that includes a small high frequency transformer.

Resistance R1 in FIG. 2 provides a small voltage drop for pulse-detection signal input to the control computer for determining engine RPM. Instead of this, one could provide another small secondary winding on the isolation transformer to derive an RPM indicating signal for the control computer if isolation was deemed desirable. Alternatively, an LED from an opto-isolator could be used to interface an RPM indicating signal to the control computer. Or, alternatively, an RPM signal could be derived from the ignition pulse start detection circuit 204 or otherwise as those in the art will recognize. Deriving and displaying RPM information from the P-lead by various techniques is well known in the prior art.

Another way to safely harvest backup electrical energy from the P-lead of an aircraft magneto is passive and illustrated in FIG. 3. It exploits the fast high bandwidth nature of the ignition event. A suitable inductance presents a high impedance and low load to a fast moving signal. Thus, a series inductance may be used to couple the P-lead to the energy harvesting circuit. The current in the inductance will not rise quickly enough to overload the combustion initiation interval but will extract energy later. A simple series inductance is all that is required prior to the rectifier bridge to achieve good results. An isolation transformer primary winding may itself provide the necessary inductance with a transformer secondary winding being used to achieve a different voltage or electrical isolation from airframe ground. This method is simpler and more robust than the switching method previously described. As before the signal is bipolar AC so a simple bridge rectifier and filter capacitor will turn it into DC.

The DC voltage provided by this method may not have the desired characteristics for the circuitry it supplies so a voltage regulator may be required. Ideally a high efficiency switching regulator would be employed.

As shown in FIG. 2, a delayed-action active switch 206 is in series with the magneto P-lead and is controlled by an ignition pulse start detection circuit 204 to close at a predetermined suitable delay (e.g., about 1 ms) thereafter. The pulse detect circuit is triggered by the first rise of the P-lead signal which then starts a delay of 1 ms or so during which the ignition initiation event proceeds unloaded. That is, the active switch 206 remains in an open state during the early combustion initiation period to allow the combustion initiation process to proceed unencumbered. After a suitable delay, active switch 206 closes to thereafter harvest energy from the P-lead (in each successive ignition event cycle) long after fuel ignition is complete.

Disconnect relay switches SW1, SW2 may, if desired, be used to connect the energy harvesting circuit only during certain times (e.g., when the normal electrical system fails). The disconnect relay is intended to isolate the harvesting circuit from the P-lead until it is needed (e.g., until the normal aircraft power stops thus releasing a current-latched disconnect relay to go to its connected state). Such isolation may reduce stress and exposure of the harvesting circuit components to high voltages and thus increase reliability. However the disconnect relay is considered to be an optional feature and may not be required.

Isolation transformer 210 is configured to provide electrical isolation between primary winding 212 (electrically connected to the P-lead during energy harvesting) and secondary winding 214 (electrically connected to the remainder of the energy harvesting circuit and the instrument(s) being powered. As will be appreciated, the isolation transformer primary/secondary windings ratio may be used to reduce the hundreds of volts coming from the P-lead to a lower voltage (e.g., several tens of volts). The resulting signal is, of course, still bipolar AC. Full-wave rectifier 220 converts the AC current to direct current (DC) and filter capacitor C1 is used to smooth the rectified current ripple to approximately 28 or 14 volts (e.g., to match the aircraft electrical system voltage which is typically 28 or 14 volts DC). The high voltage interval of the P-lead signal is very short and has negligible effect on the transformer. Power is extracted later when the signal is much lower (only a few tens of volts).

The output of bridge rectifier 220 is Ored with a similar bridge rectifier output from another similar magneto energy harvesting circuit via diode D1 and with the normal aircraft 28/14 volt DC buss voltage via diode D2. The Ored signals are then passed through voltage regulation, if desired. The function of D1 is provided by the diode bridge output diodes so it is not strictly required. D2 may provide the required DC bus input.

In the exemplary embodiments, besides the normal voltage regulator 240 (used to step the instrument supply voltage down to, e.g., 3.3 volts) a DC-DC step up power supply circuit 230 (e.g., up to 35 volts or so) is provided prior to the normal step down regulator. An intermediate energy storage capacitor C2 (which stores more energy for a given capacitance at the increased voltage level—the stored energy providing power continuing power for some limited time after engine shutdown to the instrument, e.g., for an orderly shut down of the instrument) and a final DC-DC step-down power supply circuit 240 to provide the desired low instrument voltage (e.g., 3.3 volts) power output 250 for instrument 100.

The interposed temporary energy storage circuit (step up regulator 230 and energy storage capacitor C2) provide temporary power after the engine stops for an orderly shutdown of the file system. Since one cannot predict exactly when the power will stop, it is possible that the controlling computer system might be in the middle of writing data to the SD card memory media. This temporary supplemental power storage thus provides one or two seconds of continued powering of the instrument so as to insure completion of data recordation in memory media and an orderly closing of the file being written. It also keeps the instrument running across any brief interruptions which might contain valuable information if logged. The reason for voltage step up followed by voltage step down is to minimize the size of capacitor required for energy storage. The energy stored in a capacitor is proportional to voltage squared so the more voltage the better. If the storage capacitor is charged to, e.g., 12 volts and the instrument will work even down to 6 volts (before the final voltage reduction stage), the use of 12 volts for energy storage in a given size capacitor would store only about ⅛th the energy that can be stored for continued instrument operation if 35 volts is used for energy storage and discharge down to the minimum 6 volts for continued instrument operation. In the first case, the capacitor might be about the size of a D battery and in the second case the size of the required capacitor might be about the size of an AA battery. Cost is similarly affected. However, a simple arrangement could use only the final step down voltage regulator (or none at all if the isolation transformer secondary outputs a lower voltage).

Or circuit diode D1 is not actually required since its function is already provided by the diode bridge of the other energy harvesting circuit. Note too, that the passive diode bridge 220 could be replaced by an active rectifier where synchronously controlled MOSFET switches are used to rectify AC into DC power.

FIG. 3 depicts a similar but passive energy harvesting circuit where like elements are depicted with the same reference numerals as in FIG. 2. As in the active switching energy harvesting circuit 200 of FIG. 2, the isolation transformer is optional. Here it will be seen that the ignition pulse start detection circuit 204 and delayed active switch 206 have been omitted in favor of using the inductance of the isolation transformer primary winding 212 to delay the harvesting of energy from the P-lead of the magneto. Of course, if desired, additional inductance can be provided by an inductor connected in series with the primary winding 212. Typical required inductance is on the order of 10-500 mH. The DC blocking capacitor is not necessary but might be preferred by some who would worry about connecting a transformer primary winding directly to a magneto P-lead that has only a few ohms of DC resistance. However the magneto points effect a short circuit across the magneto primary winding until they are opened to create a spark initiating event. Thus, there is in reality little or no DC voltage present at the P-lead.

Energy harvesting could be done without any inductor. A resistor could limit current or no limit could be provided. A single diode could be used to rectify. No rectifier is needed if the active switch is synchronous with the pulse and triggered only on one polarity. A full wave rectification could be done with 2 or 4 switches and synchronous switching instead of diodes.

The backup power provided by the energy harvesting circuits may be used to power other instruments and/or appliances.

While the examples discussed above have been described in connection with what are presently considered to be practical and preferred features, it is to be understood that appended claims are intended to cover modifications and equivalent arrangements included within the spirit and scope of these examples.

What is claimed is:

1. An energy harvesting circuit for safely harvesting electrical energy from an aircraft engine ignition magneto having a P-lead, said circuit comprising:
   a time-sensitive circuit connecting said P-lead to an AC-to-DC rectifier circuit after a delay from the start of a magneto ignition initiation event to produce a DC output voltage by harvesting unused electrical energy from the ignition magneto P-lead without adversely affecting the ignition initiation event.

2. The energy harvesting circuit of claim 1 wherein said time-sensitive circuit comprises:
    an isolation transformer including (a) a primary winding configured for connection to a magneto P-lead of an aircraft engine ignition magneto and to extract electrical energy there-from only after an aircraft engine combustion initiation event is substantially completed and (b) a secondary winding,
    said AC-to-DC rectifier circuit being connected to said secondary winding for producing a DC output voltage.

3. The energy harvesting circuit of claim 2 further comprising a first DC-DC voltage regulator connected to the output of said rectifier circuit to produce a regulated output DC voltage for powering an aircraft instrument.

4. The energy harvesting circuit of claim 3 further comprising a second DC-DC voltage regulator connected to the output of said rectifier circuit prior to the first D-DC voltage regulator to produce an output DC voltage greater than an input voltage to the second DC-DC voltage regulator; and
    a capacitor to store energy from the second DC-DC voltage regulator.

5. The energy harvesting circuit of claim 2 further comprising an OR circuit connected OR together the output of said rectifier and the output of another similar energy harvesting electrical circuit simultaneously harvesting electrical energy from another aircraft engine ignition magneto.

6. The energy harvesting circuit of claim 5 further comprising an input to said OR circuit configured for connection to an aircraft DC power supply buss.

7. The energy harvesting circuit of claim 5 further comprising a DC-DC voltage regulator connected to the output of said OR circuit to produce a regulated output DC voltage for powering an aircraft instrument.

8. The energy harvesting circuit of claim 1 wherein said time-sensitive circuit comprises:
    an actively controlled switch connecting the P-lead to said AC-to-DC rectifier circuit after a delay from the start of a magneto ignition initiation event to produce a DC output voltage by harvesting unused electrical energy from the ignition magneto P-lead without adversely affecting the ignition initiation event.

9. The energy harvesting circuit of claim 1 wherein said time-sensitive circuit comprises:
    an inductor connected in series with said P-lead to extract energy from the P-lead only after a delay from the start of a magneto ignition initiation event to produce a DC output voltage by harvesting unused electrical energy from the ignition magneto P-lead without adversely affecting the ignition initiation event.

* * * * *